(12) United States Patent
Kavanaugh

(10) Patent No.: US 8,769,864 B2
(45) Date of Patent: *Jul. 8, 2014

(54) FISHING BOBBERS

(71) Applicant: Patrick John Kavanaugh, Eau Claire, WI (US)

(72) Inventor: Patrick John Kavanaugh, Eau Claire, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,386

(22) Filed: Nov. 27, 2012

(65) Prior Publication Data

US 2013/0326928 A1    Dec. 12, 2013

Related U.S. Application Data

(63) Continuation of application No. 13/009,061, filed on Jan. 19, 2011, now Pat. No. 8,341,871.

(51) Int. Cl.
*A01K 93/00* (2006.01)
*A01K 95/02* (2006.01)

(52) U.S. Cl.
USPC ........... 43/43.1; 43/44.9; 43/44.92; 43/44.87; 43/44.91; 43/44.95

(58) Field of Classification Search
USPC .............. 43/44.9, 44.92, 44.93, 44.87, 44.91, 43/44.95, 44.89
See application file for complete search history.

(56) References Cited

U.S. PATENT DOCUMENTS

| | | |
|---|---|---|
| 522,167 A | 6/1894 | Rawlings |
| 668,254 A | 2/1901 | Dickinson |
| 1,504,884 A | 8/1924 | Garst |
| 2,315,048 A | 3/1943 | Croft |
| 2,483,788 A | 10/1949 | Smith |
| 2,531,806 A * | 11/1950 | Coughlin .................... 43/44.91 |
| 2,570,293 A | 10/1951 | Vadnais |
| 2,729,015 A | 1/1956 | Finnegan |
| 2,778,147 A | 1/1957 | Peck, Jr. |
| 2,829,464 A | 4/1958 | Pettit, Jr. et al. |
| 2,827,752 A | 2/1959 | Salzmann |
| 2,992,508 A | 7/1961 | Schmidt |
| 3,019,546 A | 2/1962 | Hansen |
| 3,056,229 A | 10/1962 | Haney |
| 3,091,050 A | 5/1963 | Metzler |
| 3,096,599 A | 7/1963 | Baron |

(Continued)

OTHER PUBLICATIONS

Prosecution documents from U.S. Appl. No. 13/009,061, filed Jan. 19, 2011, 66 pages.

*Primary Examiner* — Kimberly Berona
*Assistant Examiner* — Michael Wang
(74) *Attorney, Agent, or Firm* — Christopher L. Holt; Kelly, Holt & Christenson, PLLC

(57) ABSTRACT

In one embodiment, a fishing line bobber includes a bobber body having a length and an exterior surface. The bobber body includes an aperture that extends through the length of the bobber body and a slot extending along the length of the bobber body and connected to the aperture through sidewalls that extend from the exterior surface of the bobber body inward to the aperture. The fishing line bobber includes a closing mechanism movable with respect to the bobber body between an open position that permits insertion of a fishing line into the aperture and a closed position that retains the fishing line within the aperture. The closing mechanism is configured to enable the fishing line bobber to function as an attachment bobber that maintains a fixed position on the fishing line and as a slip bobber that is moveable along the fishing line.

13 Claims, 7 Drawing Sheets

(56) References Cited

U.S. PATENT DOCUMENTS

| | | | |
|---|---|---|---|
| 3,224,132 A * | 12/1965 | Frantz | 43/17.2 |
| 3,273,278 A | 9/1966 | Lynch | |
| 3,733,734 A | 5/1973 | Hysaw | |
| 3,803,749 A | 4/1974 | Boyum | |
| 4,026,062 A * | 5/1977 | Mosley et al. | 43/44.87 |
| 4,361,978 A | 12/1982 | Kane | |
| 4,418,492 A | 12/1983 | Rayburn | |
| 4,458,439 A | 7/1984 | Garrett, Sr. | |
| 4,635,392 A | 1/1987 | Wirkus | |
| 4,656,777 A | 4/1987 | Fernbach | |
| 4,696,125 A | 9/1987 | Rayburn | |
| 5,241,774 A | 9/1993 | Rayburn | |
| 5,305,534 A * | 4/1994 | Lazich | 43/44.91 |
| 5,377,444 A | 1/1995 | Gibney, Sr. | |
| 7,162,830 B2 * | 1/2007 | Sims | 43/44.9 |
| 7,614,179 B2 * | 11/2009 | Kavanaugh | 43/44.91 |
| 7,805,881 B2 * | 10/2010 | Kavanaugh | 43/44.91 |
| 8,196,338 B2 * | 6/2012 | Kavanaugh | 43/44.91 |

* cited by examiner

FISHING BOBBERS

CROSS-REFERENCE TO RELATED APPLICATION

The present application is a continuation of and claims priority to U.S. patent application Ser. No. 13/009,061, filed Jan. 19, 2011, the content of which is hereby incorporated by reference in its entirety.

BACKGROUND

Fishing bobbers are commonly connected to a fishing line when fishing. Bobbers can serve several functions. One possible function includes controlling the depth of the hook and bait. Another possible function includes providing a signaling mechanism for indicating when a fish is biting at the bait or when a fish has been hooked.

Two types of fishing bobbers include attachment bobbers and slip bobbers. Attachment bobbers are maintained at a fixed position on the fishing line. For instance, some attachment bobbers having a clipping mechanism that securely fastens the bobber to a particular location on the line. Slip bobbers on the other hand are not attached to one particular location along the line and are able to move at least some distance along the line. For instance, a slip bobber may be placed between a hook and a knot in a fishing line, and the slip bobber is able to move between the hook and the knot.

SUMMARY

An aspect of the disclosure relates to fishing bobbers. In one exemplary embodiment, a fishing line bobber includes a bobber body having a length and an exterior surface. The bobber body includes an aperture that extends through the length of the bobber body and a slot extending along the length of the bobber body and connected to the aperture through sidewalls that extend from the exterior surface of the bobber body inward to the aperture. The fishing line bobber includes a closing mechanism movable with respect to the bobber body between an open position that permits insertion of a fishing line into the aperture and a closed position that retains the fishing line within the aperture. The closing mechanism is configured to enable the fishing line bobber to function as an attachment bobber that maintains a fixed position on the fishing line and as a slip bobber that is moveable along the fishing line.

In one exemplary embodiment, a fishing line bobber includes an elongated portion having an outer surface, a substantially cylindrical aperture, a tab channel formed in the outer surface, and a slot that enables a fishing line to be positioned within the aperture. The fishing line bobber includes a closing mechanism rotatably positioned within the substantially cylindrical aperture of the elongated portion. The closing mechanism includes a tab positioned in the tab channel and configured to rotate the closing mechanism between an open position in which the fishing line is insertable into the aperture and a closed position in which the fishing line is retained within the aperture.

In one exemplary embodiment, a fishing line bobber includes a buoyant body portion having an aperture formed through a length thereof for receiving a fishing line. The buoyant body portion includes a first body portion having a first slot, a second body portion having a second slot, and a central body portion having a third slot and positioned between the first and second body portions. The central body portion includes a cross-sectional member extending transverse to the aperture. The first, second, and third slots are aligned to form a slot running along the length of the buoyant body portion that enables the fishing line to be positioned within the aperture. A closing mechanism is movable between an open position that permits the fishing line to be positioned within the aperture and a closed position that retains the fishing line within the aperture.

These and various other features and advantages that characterize the claimed embodiments will become apparent upon reading the following detailed description and upon reviewing the associated drawings.

DETAILED DESCRIPTION

Embodiments of the present disclosure include fishing bobbers. One particular example of a fishing bobber 100 is shown in FIGS. 1-6. It should be noted however that embodiments of the present disclosure are not limited to the specific example shown in the figures. Embodiments of the present disclosure illustratively include fishing bobbers having any one or more features or combination of features described in this specification and/or shown in the figures.

Figure 1:
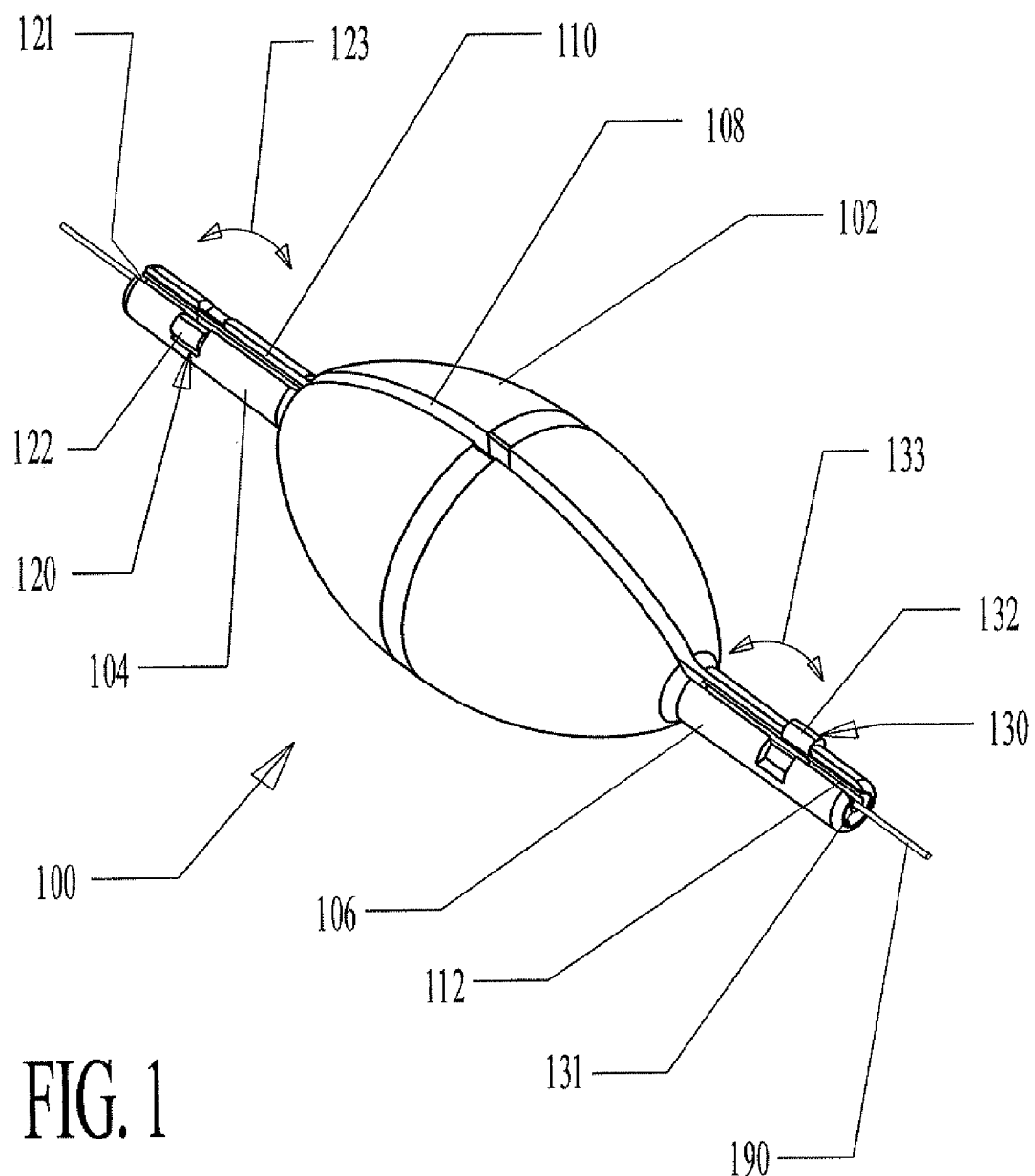
FIG. 1 is a perspective view of a fishing bobber with its closing mechanisms in the open position.

FIG. 1 is a perspective view of bobber 100 having a fishing line 190 running through the bobber. In an embodiment, bobber 100 includes a main body portion 102, a first shaft portion 104, and, a second shaft portion 106. Main body portion 102 includes a slot 108 that extends from an outer surface of the main body portion towards the center of the main body portion. First shaft portion 104 includes a slot 110 that extends from the outer surface of the first shaft portion towards the center of the first shaft portion, and second shaft portion 106 includes a slot 112 that extends from the outer surface of the second shaft portion towards the center of the second shaft portion. The main body slot 108, the first shaft slot 110, and the second shaft slot 112 are illustratively aligned such that they form a channel that runs along the entire length of bobber 100. The width of the channel is greater than the width of fishing line 190 such that fishing line 190 is able to be fit within and run through bobber 100.

Bobber 100 also illustratively includes one or more closing mechanisms for connecting bobber 100 to fishing line 190. In the particular example shown in FIG. 1, bobber 100 includes a first closing mechanism 120 and a second closing mechanism 130. Embodiments are not however limited to any particular number of closing mechanisms and may include more or less than the illustrated two (e.g. 0, 1, 3, 4, etc. closing mechanisms). First closing mechanism 120 includes a slot 121 and a tab 122. First closing mechanism 120 is able to rotate within first shaft portion 104 in the directions shown by arrow 123. Second closing mechanism 130 includes a slot 131 and a tab 132. Second closing mechanism 130 is able to rotate within second shaft portion 106 in the directions shown by arrow 133.

In one embodiment, a user rotates first closing mechanism 120 using tab 122 such that the slot 121 of the first closing mechanism is aligned with the slot 110 of the first shaft portion to form an opening. The user is then able to position fishing line 190 within slot 121 of the first closing mechanism 120. The user similarly rotates second closing mechanism 130 using tab 132 such that the slot 131 is aligned with the slot 112 of the second shaft portion to form another opening. The user is then able to position fishing line 190 within slot 131 of the second closing mechanism 130.

Figure 2:
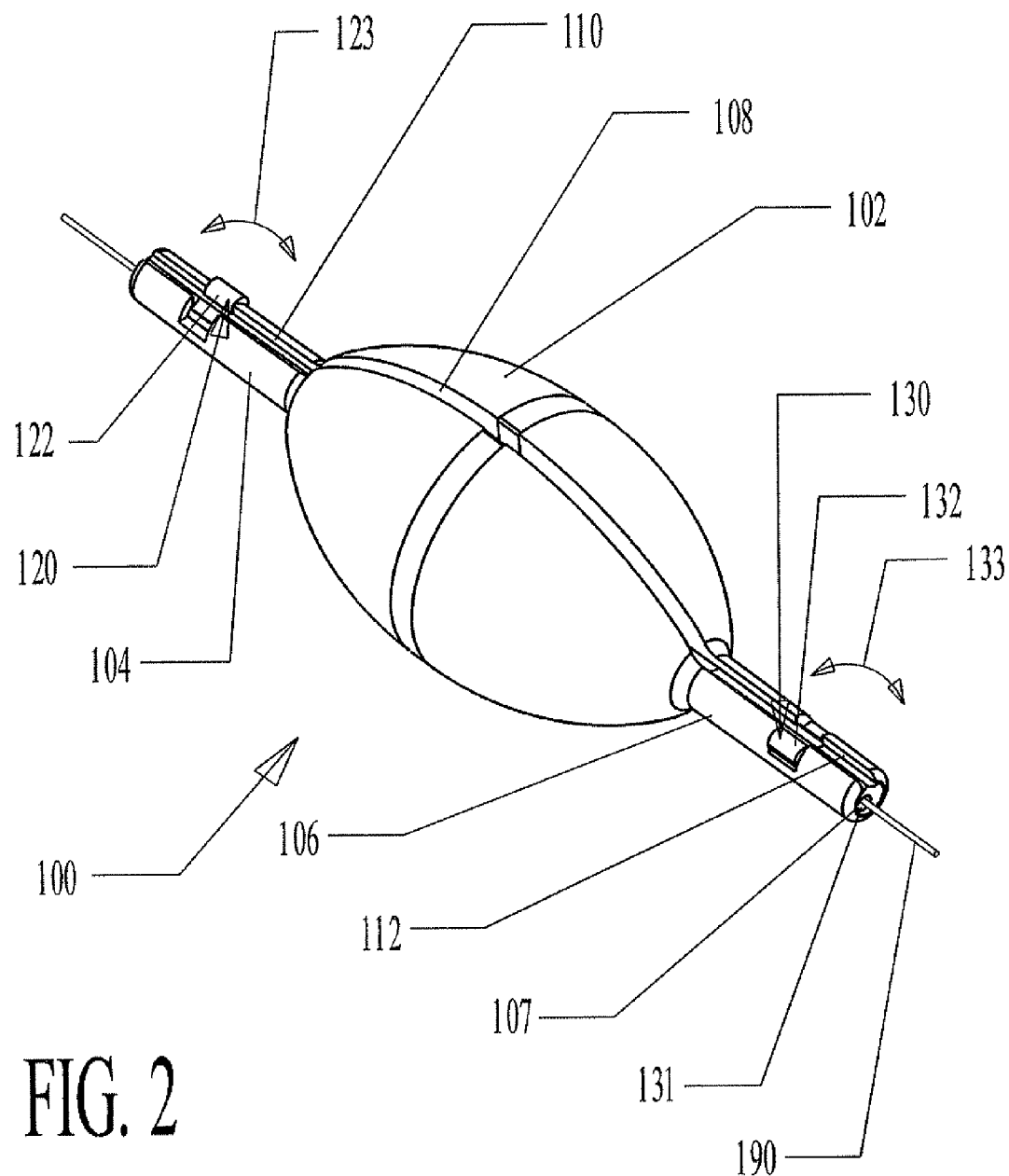
FIG. 2 is a perspective view of a fishing bobber with its closing mechanisms in the closed position.

After fishing line 190 is positioned within the slots of the closing mechanisms and within the main body slot 108, the first closing mechanism 120 and the second closing mechanism 130 are rotated to a closed position to connect bobber 100 to fishing line 190. FIG. 2 shows a perspective view of fishing bobber 100 with closing mechanisms 120 and 130 rotated to their closed positions. In FIG. 2, both the first closing mechanism tab 122 and the second closing mechanism tab 132 have been rotated such that the slots of the closing mechanisms 121 and 131 (shown in FIG. 1) are no longer aligned with the shaft slots 110 and 112 to form openings. As can perhaps be best seen in the bottom right hand corner of FIG. 2, when closing mechanism 130 is rotated into the closed position, fishing line 190 is enclosed within an inner wall 107 of the second shaft portion 106 and the wall of the second closing mechanism slot 131. When first closing mechanism 120 is rotated into the closed position, fishing line 190 is similarly enclosed with an inner wall of the first shaft portion 104 and the wall of the first closing mechanism slot 121. Accordingly, bobber 100 is able to be connected to and released from fishing line 190 by rotating first and second closing mechanisms 120 and 130 into their open and closed positions.

As can be seen in FIG. 2, in one embodiment, fishing line 190 is positioned within the closing mechanisms 120 and 130 such that the fishing line 190 is able to move throughout the length of bobber 100. The surfaces of bobber 100 that may come into contact with fishing line 190 are optionally smooth such that there is a minimal amount of friction between the line 190 and the bobber 100. In such a case, bobber 100 illustratively can be used as a slip bobber. Additionally, as is described in greater detail below, certain embodiments of bobber 100 may also include features that enable the bobber to be used as an attachment bobber as well as a slip bobber.

Figure 3A:
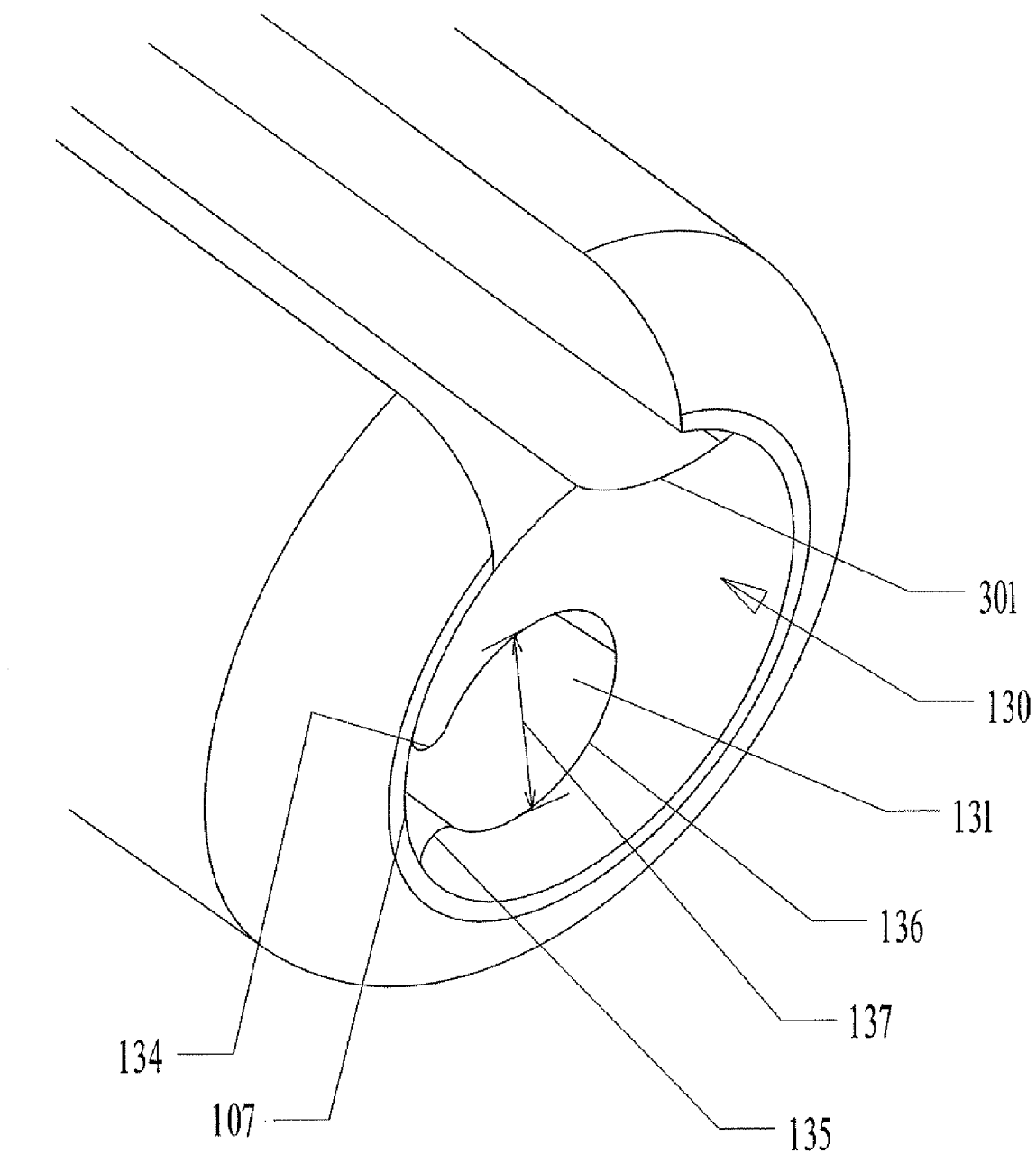
FIG. 3A is a close-up view of a bobber closing mechanism.

FIG. 3A is a close-up view of one illustrative end of a bobber. In the example shown in the figure, closing mechanism 130 includes two different slots that run along the entire length of the closing mechanism. The first slot 131 has a first edge 134, a second edge 135, and a circular wall 136. Circular wall 136 has a diameter 137. In an embodiment, diameter 137 is larger than a diameter of a fishing line to be used with the bobber. Accordingly, when a fishing line is positioned within first slot 131, the bobber is able to freely move along the length of the fishing line and function as a slip bobber. The fishing line is prevented from escaping first slot 131 by an inner wall 107 of the shaft portion FIG. 3A also shows that closing mechanism 130 has a second slot 301. In one embodiment, slot 301 is formed as a shallow groove that runs along the length of the closing mechanism 130. In the example shown in the figure, second slot 301 is formed as one continuous curved surface. Embodiments of second slot 301 are not however limited to any particular configuration and may have a different shape or design.

Figure 3C:
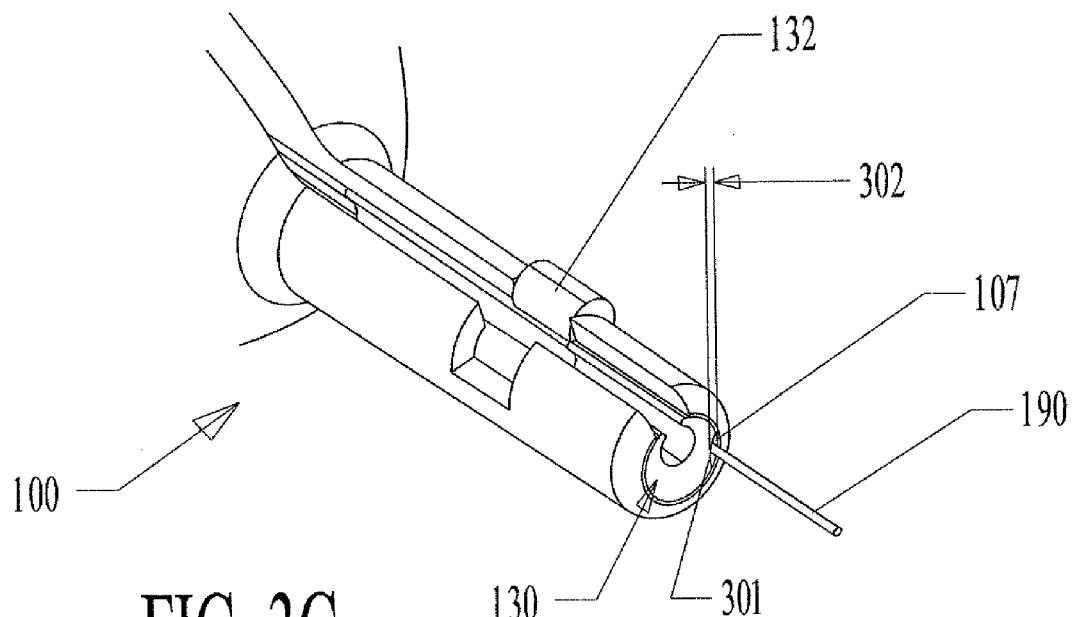
FIG. 3C is a close-up view of a fishing line being enclosed within an "attachment slot" of a bobber.
Figure 3B:
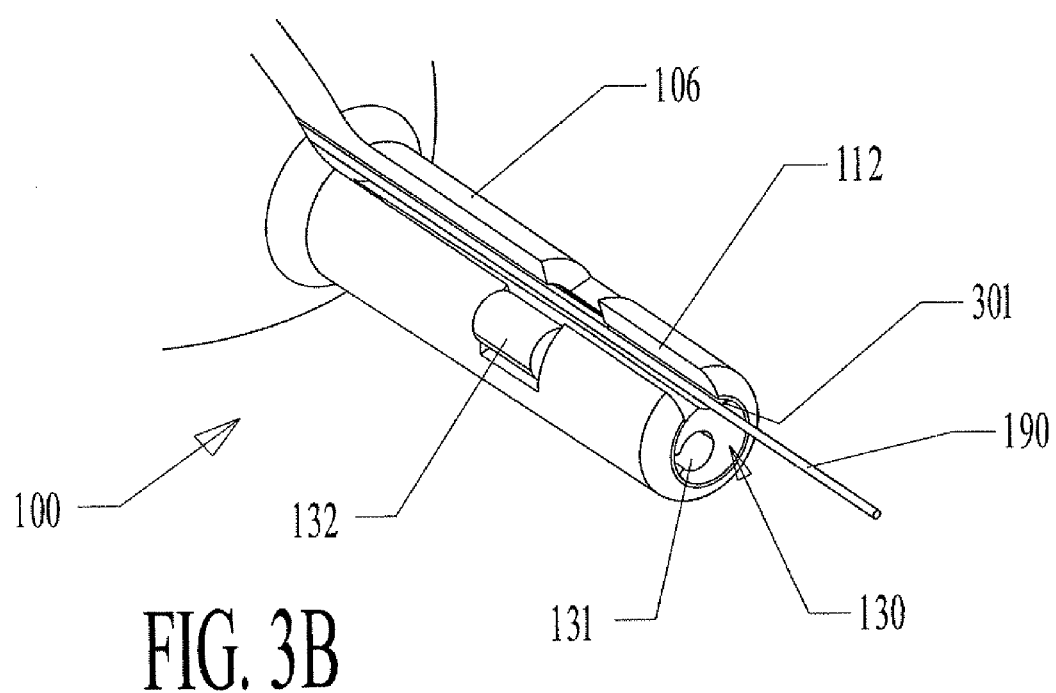
FIG. 3B is a close-up view of a fishing line being placed within an "attachment slot" of a bobber.

FIGS. 3B and 3C show how a fishing line 190 may be connected to fishing bobber 100 utilizing second slot 301. In FIG. 3B, the closing mechanism has been rotated using tab 132 such that the closing mechanism second slot 301 is aligned with the shaft slot 112. This allows for fishing line 190 to be placed within slot 301. In FIG. 3C, the closing mechanism has been rotated using tab 132 such that the closing mechanism second slot 301 is aligned with an inner wall 107 of the shaft portion and not aligned with shaft slot 112. Accordingly, the second slot 310 and the shaft inner wall 107 form an enclosed space that captures fishing line 190.

In an embodiment, second slot 301 has a depth such that the distance 302 between the second slot 301 and the shaft inner wall 107 is less than the diameter/width of fishing line 190. In such an embodiment, fishing line 190 is prevented from moving along the length of second slot 301. Second slot 301 can therefore be used to maintain bobber 100 at a fixed position on fishing line 190. In other words, second slot 301 enables bobber 100 to be used as an attachment bobber.

As can be seen in FIGS. 3A-3C, a closing mechanism 130 may include both a slot 131 that enables a bobber to move along the length of a fishing line (i.e. a "slip slot"), and a slot 301 that enables a bobber to be maintained at a fixed position along the length of a fishing line (i.e. an "attachment slot"). Accordingly, in at least certain embodiments of the present disclosure, one single bobber can function both as a slip bobber and as an attachment bobber depending upon the positioning of the fishing line within the bobber.

Additionally, it should be noted that although FIGS. 3A-3C only show one closing mechanism having two slots (i.e. slots 131 and 301), it should be recognized that each closing mechanism within a bobber (e.g. both closing mechanisms 120 and 130 in FIG. 1) illustratively include two slots. In such an embodiment, a bobber can be used as a slip bobber by enclosing the fishing line within the "slip slots" of each of the closing mechanisms, or the bobber can be used as an attachment bobber by enclosing the fishing line within the "attachment slots" of each of the closing mechanisms. Embodiments of bobbers of the present disclosure are not however limited to any particular design. For instance, bobbers may have only "slip slots," only "attachment slots," or any combination of both "slip slots" and "attachment slots." Also for instance, embodiments of bobbers may have any number of closing mechanisms (e.g. 1, 2, 3, etc.) with any number of slots within each of the closing mechanisms (e.g. 1, 2, 3, etc.).

Figure 4:
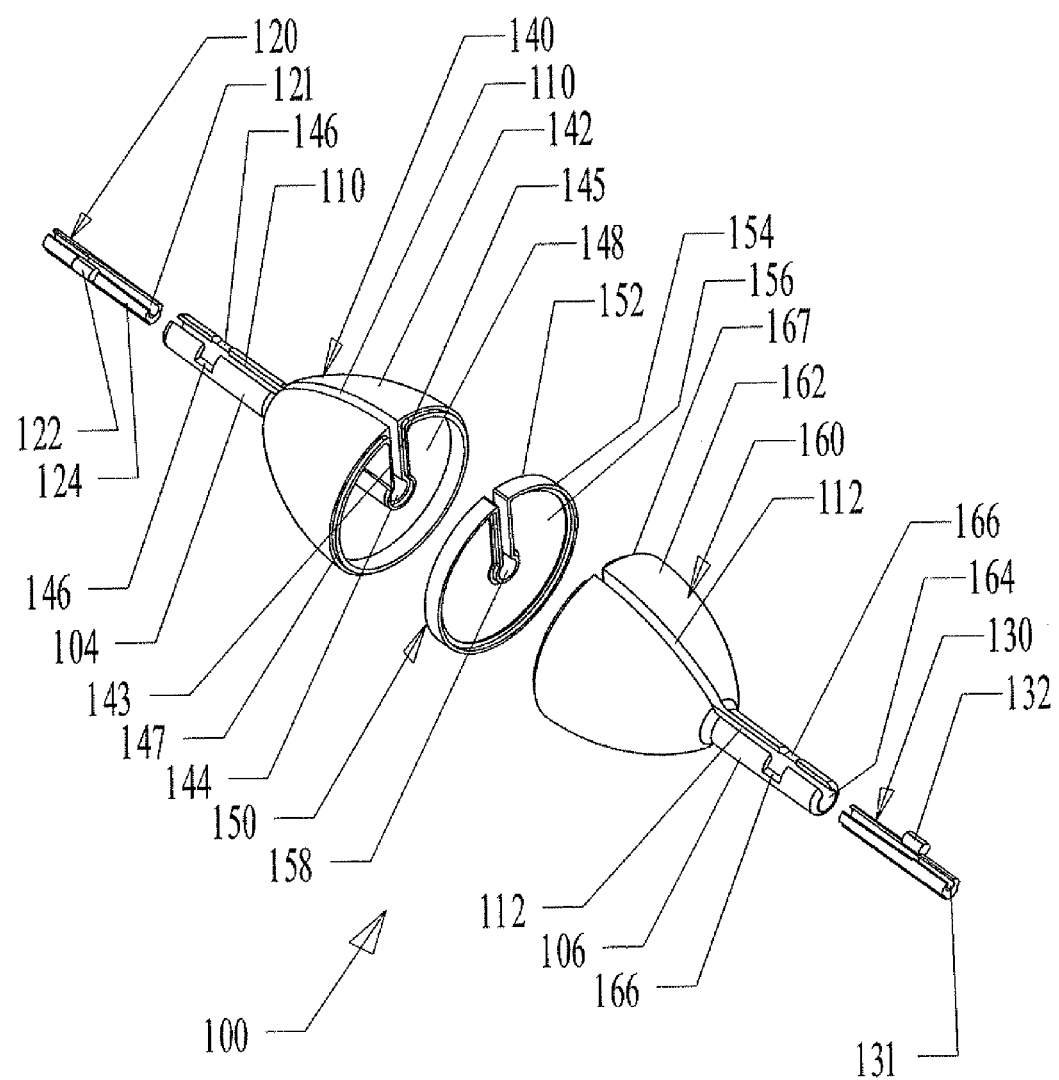
FIG. 4 is an exploded view of a fishing bobber.

FIG. 4 shows an exploded view of bobber 100 with each of the parts of bobber 100 separated from each other. In the embodiment shown in the figure, bobber 100 is made using five pieces. Each of the pieces is optionally made using the same material (e.g. a plastic). However, embodiments of the present disclosure are not limited to any particular construction and may be made using more or less than the illustrated five pieces, and may be made from any material or combination of materials.

Bobber 100 illustratively includes a first closing mechanism 120, a first combined shaft/main body portion 140, a center portion 150, a second combined shaft/main body portion 160, and a second closing mechanism 130. In an embodiment, first and second closing mechanisms 120 and 130 are the same, and first and second combined shaft/main body portions 140 and 160 are the same. This may reduce manufacturing costs by reducing the number of different parts that need to be made. The parts do not however necessarily need to be made to be the same and may be different.

First closing mechanism 120 illustratively includes a tab 122, a generally cylindrical portion 124, and a slot 121. First combined shaft/main body portion 140 illustratively includes a first shaft portion 104, a first main body portion 142, and a central aperture 144 that runs throughout the length of the portion 140. The outer diameter of the closing mechanism generally cylindrical portion 124 is smaller than the diameter of the central aperture 144 such that the first closing mechanism 120 is able to be positioned within the central aperture 144. In particular, first closing mechanism 120 is positioned within shaft portion 104.

First combined shaft/main body portion 140 also illustratively includes a tab channel 146 that runs perpendicular to the slot 110. Tab channel 146 provides space on either side of slot 110 such that tab 122 can be rotated between the open and closed positions. Side walls 143 and 145 run between the central aperture 144 and the outer perimeter of the bobber. Side walls 143 and 145 are illustratively smooth and enable a fishing line to be positioned within and removed from the bobber.

First combined shaft/main body portion 140 optionally includes a ridge 147 that is smaller than a ridge 152 of center portion 150. First combined shaft/main body portion 140 may be connected to center portion 150 by fitting ridge 147 within ridge 152. In an embodiment, first combined shaft/main body portion 140 is hollow such that it has an air space 148. First shaft/main body portion 140 is illustratively connected to center portion 150 such that water cannot or has difficulty entering air space 148. In such a case, air space 148 provides buoyancy to the bobber enabling the bobber to float. In one embodiment, first shaft/main body portion 140 and center portion 150 may be connected using a water resistant adhesive. However, first shaft/main body portion 140 and center portion 150 do not necessarily need to be connected using an adhesive and can be connected by other means (e.g. thermally sealed together, mechanically snap-fit to each other, etc.).

Center portion 150 also illustratively includes a second ridge 154, a cross-sectional member 156, and an aperture 158. In an embodiment, aperture 158 is formed such that it has portions corresponding to the central aperture 144 and sidewalls 143, 145 of the first combined shaft/main body portion 140. Accordingly, aperture 158 allows a fishing line to be positioned within the bobber and optionally run through the bobber (e.g. for the bobber to be used as a slip bobber). Cross-sectional member 156 in at least some embodiments provides mechanical support for the bobber. For example, cross-sectional member 156 may make a bobber more rigid and less compressible. Second ridge 154 is illustratively used to connect second shaft/main body portion 160 to center portion 150. For instance, second shaft/main body portion 160 optionally includes a ridge 167 that is smaller second ridge 154. Second shaft/main body portion 160 can then be connected to center portion 150 by fitting ridge 167 within ridge 154. Second shaft/main body portion 160 may be secured to center portion 150 in the same or similar manner as first shaft/main body portion 150 is secured to center portion 150 (e.g. adhesive or snap-fit). Second shaft/main body portion 160, as well as first shaft main/body portion 140, are not however limited to any particular method of attachment to center portion 150.

In another embodiment, bobber 100 does not include a center portion 150. Instead, first shaft/main body portion 140 is directly connected to second shaft/main body portion 160. Additionally, in yet another embodiment, bobber 100 does not need to include two separate pieces for first shaft/main body portion 140 and second shaft/main body portion 160. Instead, the first shaft/main body portion 140 and second shaft/main body portion 160 are formed as one piece. For instance, a bobber 100 may be constructed from only three pieces such as from two closing mechanisms (e.g. closing mechanisms 120 and 130) and one single combined shaft/main body portion. Embodiments of the present disclosure are not however limited to any particular construction and may be constructed using any of the methods described above or any other methods.

Second shaft/main body portion 160 illustratively includes a second main body portion 162 and a second shaft portion 106. In an embodiment, such as in the one shown in FIG. 4, second shaft/main body portion 160 includes the same or similar components as first shaft/main body portion 140. For instance, FIG. 4 shows that second shaft/main body portion 160 also includes a slot 112, a tab channel 166, and a central aperture 164. Second shaft/main body portion 160 also optionally includes the other parts of first shaft/main body portion 140 such as sidewalls running from the central aperture to the outer perimeter of the bobber and an air space for providing buoyancy.

In one embodiment, second closing mechanism 130 is the same or similar to first closing mechanism 120 and illustratively fits within second shaft/main body portion 160 the same or similar to as how first closing mechanism 120 fits within first shaft/main body portion 140. For instance, in an embodiment, a tab 132 of second closing mechanism 130 fits with a tab channel 166 of the second shaft/main body portion 160, and is used to align a slot 131 of the second closing mechanism 130 with a slot 112 of the second shaft/main body portion 160 to move the second closing mechanism into an open position to receive a fishing line.

Figure 5:
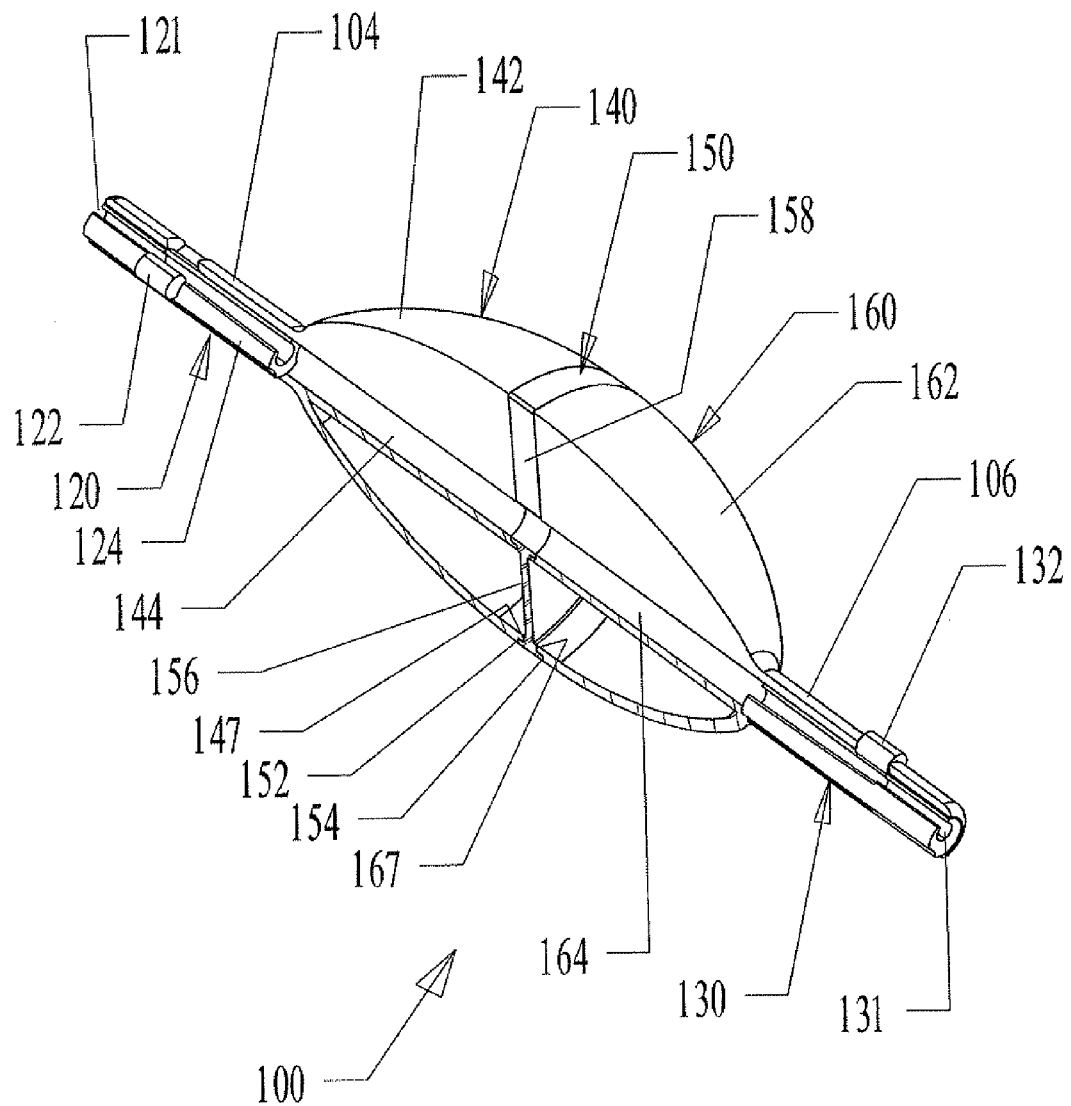
FIG. 5 is a cross-sectional view of a fishing bobber.

FIG. 5 shows a cross-sectional view of the bobber 100. As can be seen in the figure, a slot 121 of first closing mechanism 120, a central aperture 144 of first shaft/main body portion 140, a central aperture 158 of center portion 150, a central aperture 164 of second shaft/main body portion 160, and a slot 131 of second closing mechanism 130 illustratively form one continuous open tubular space that enables a fishing line to be positioned within and run through bobber 100. FIG. 5 also shows how ridge 147 of first shaft/main body portion 140 fits within ridge 152 of center portion 150 to connect the two pieces together in a water resistant manner, and how ridge 167 of second shaft/main body portion 160 fits within ridge 154 of center portion 150 to connect the two pieces together in a water resistant manner. Furthermore, FIG. 5 shows that first shaft portion 104 and first main body portion 142 are formed together as one piece, and that second shaft portion 106 and second main body portion 162 are formed together as one piece.

Figure 6:
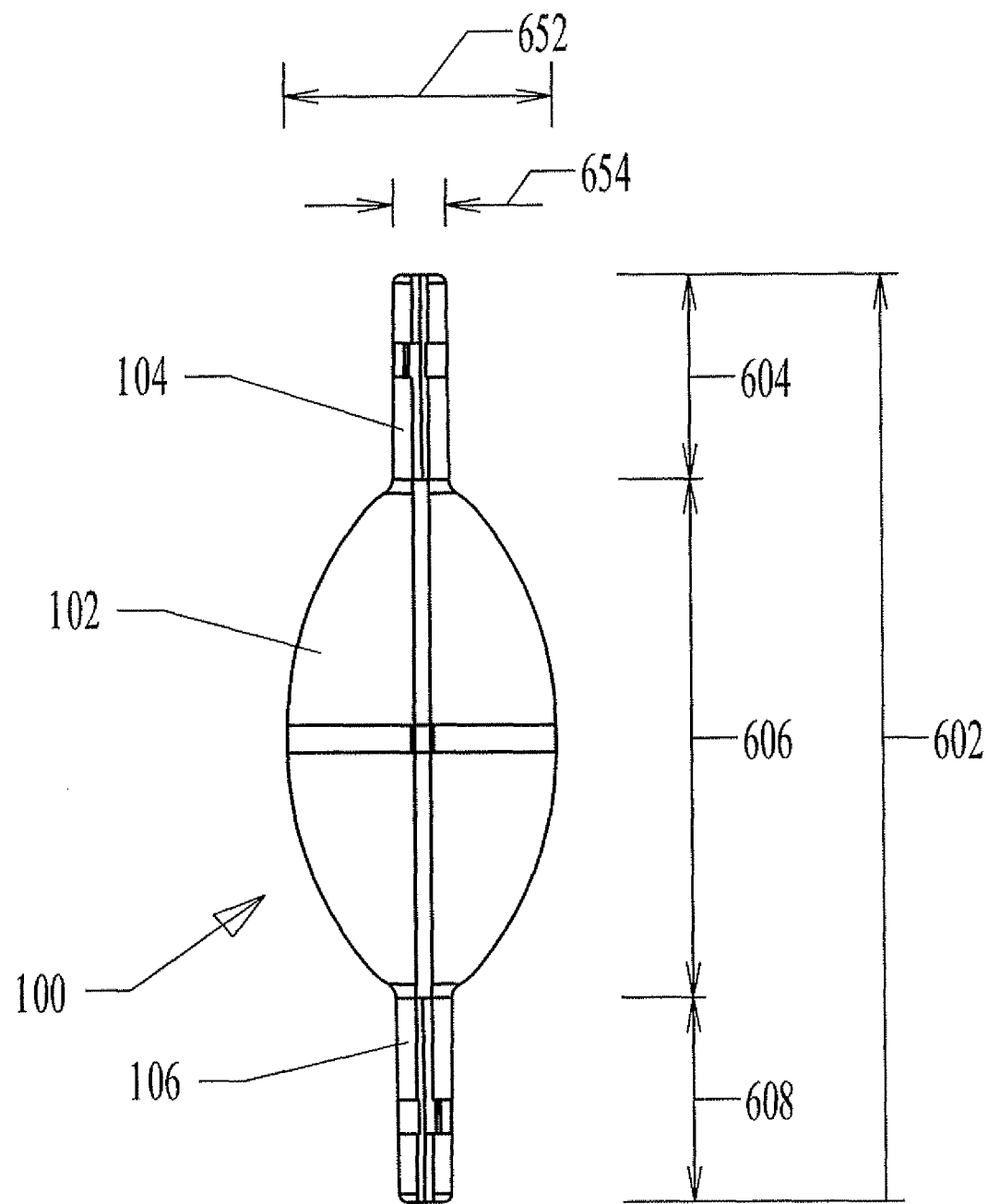
FIG. 6 is a side view of a fishing bobber.

FIG. 6 is a side view of bobber 100. FIG. 6 is useful in showing some of the dimensions of bobber 100. Bobber 100 includes an overall length 602 and a maximum width 652. In an embodiment, overall length 602 is between two and five inches, and maximum width 652 is between half an inch and two inches. Bobber 100 also includes a minimum width 654, a first shaft portion 104 length 604, a main body portion 102 length 606, and a second shaft portion 106 length 608. Minimum width 654 is illustratively between five and thirty percent of the maximum overall width 652. First and second shaft lengths 604 and 608 are each illustratively between five and forty percent of the overall length 602, and the main body portion length 606 is illustratively between forty and ninety percent of the overall length 602. Embodiments of the present disclosure are not however limited to any particular dimensions or ratios, and may include dimensions and ratios outside of those mentioned above.

As can be seen in FIG. 6 and in the other figures, both first shaft portion 104 and second shaft portion 106 have a generally cylindrical shape. The widths 654 of the first and second shaft portions 104, 106 are more or less approximately uniform throughout the lengths 604, 608 of the shaft portions. Additionally, the lengths 604 and 608 of the shaft portions 104, 106 are optionally the same or approximately the same as each other. Main body portion 102 illustratively has a football or oval like shape such that it has a minimal width 654 at its two outer ends and the width increases going towards the center of the main body until the width reaches a maximum width of 652 at the center. Embodiments of the present disclosure are not however limited to any particular shapes or designs, and shapes and designs other than those shown in the figures may be included within embodiments.

As has been described above, embodiments of the present disclosure include fishing bobbers. In some embodiments, fishing bobbers include closing mechanisms that enable the bobbers to easily be connected to or removed from a fishing line by rotating the closing mechanisms between open and closed positions. Bobbers may also have "attachment slots" and/or "slip slots" that enable a bobber to be used as either a slip bobber or as an attachment bobber. Additionally, certain embodiments may be less expensive to manufacture by only including a limited number of separate components. For instance, a shaft and a main body are illustratively combined into one component as opposed to using separate components for the shaft and the main body. Embodiments of the present disclosure also include any other feature or combination of features described above or shown in the figures.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A fishing line bobber comprising:
   a bobber body having a length and an exterior surface, the bobber body comprising:
      an aperture that extends through the length of the bobber body; and
      a slot extending along the length of the bobber body and connected to the aperture through sidewalls that extend from the exterior surface of the bobber body inward to the aperture;
   a closing mechanism movable with respect to the bobber body between an open position that permits insertion of a fishing line into the aperture and a closed position that retains the fishing line within the aperture;
   wherein the closing mechanism is configured to enable the fishing line bobber to function as an attachment bobber that maintains a fixed position on the fishing line and as a slip bobber that is moveable along the fishing line, and wherein the closing mechanism comprises:
      a first attachment slot configured to enable the bobber to function as an attachment bobber; and
      a second slip slot configured to enable the bobber to function as a slip bobber; and
   wherein the closing mechanism is rotatable with respect to the bobber body to selectively align either of the first attachment slot and the second slip slot with the slot of the bobber body.

2. The fishing line bobber of claim 1, wherein the bobber body comprises a main body portion and a pair of shaft portions positioned on opposing ends of the main body portion.

3. The fishing line bobber of claim 1, wherein the closing mechanism comprises a channel being aligned with the slot to form one continuous opening between the channel and the slit when the closing mechanism is in the open position, the channel of the closing mechanism being separated from the slot by an inner surface of the closing mechanism when the closing mechanism is in the closed portion.

4. The fishing line bobber of claim 1, wherein the second slip slot includes two edges connected by a partially cylindrical surface, and wherein the first attachment slot includes a curved surface.

5. The fishing line bobber of claim 1, wherein each of the first attachment slot and second slip slot run along an entire length of the closing mechanism.

6. The fishing bobber of claim 5, wherein the first attachment slot and second slip slot are parallel to each other.

7. The fishing line bobber of claim 1, wherein the first attachment slot is configured to form an enclosed space with an inner surface of the bobber body.

8. The fishing line bobber of claim 7, wherein the enclosed space has a width that is less than a width of the fishing line.

9. The fishing line bobber of claim 1, and further comprising a second closing mechanism.

10. A fishing line bobber comprising:
    an elongated portion having an outer surface, a substantially cylindrical aperture, a tab channel formed in the outer surface, and a slot that enables a fishing line to be positioned within the aperture; and
    a closing mechanism rotatably positioned within the substantially cylindrical aperture of the elongated portion, the closing mechanism comprising:
       a tab position in the tab channel and configured to rotate the closing mechanism between an open position in which the fishing line is insertable into the aperture and a closed position in which the fishing line is retained within the aperture; and
    wherein the tab is disposed on the closing mechanism between a first attachment slot configured to enable the bobber to function as an attachment bobber and a second slip slot configured to enable the bobber to function as a slip bobber.

11. The fishing line bobber of claim 10, wherein the tab has a length such that it extends beyond the outer surface of the elongated portion.

12. The fishing line bobber of claim 10, wherein ends of the tab channel define rotational boundaries of the closing mechanism.

13. A fishing line bobber comprising:
    a bobber body having a length and an exterior surface, the bobber body comprising:
       an aperture that extends through the length of the bobber body, wherein at least a portion of the aperture in the bobber body is substantially cylindrical, and wherein the closing mechanism is rotatably disposed within the substantially cylindrical portion of the aperture;
       a slot extending along the length of the bobber body and connected to the aperture through sidewalls that extend from the exterior surface of the bobber body inward to the aperture;
    a closing mechanism movable with respect to the bobber body between an open position that permits insertion of a fishing line into the aperture and a closed position that retains the fishing line within the aperture; and
    wherein the closing mechanism is configured to enable the fishing line bobber to function as an attachment bobber that maintains a fixed position on the fishing line and as a slip bobber that is moveable along the fishing line.

* * * * *